(12) United States Patent
Lahnala

(10) Patent No.: US 8,127,498 B2
(45) Date of Patent: Mar. 6, 2012

(54) SLIDING WINDOW ASSEMBLY AND METHOD OF FORMING THE SAME

(75) Inventor: David W. Lahnala, Adrian, MI (US)

(73) Assignee: AGC Automotive Americas Co., Hebron, KY (US)

( * ) Notice: Subject to any disclaimer, the term of this patent is extended or adjusted under 35 U.S.C. 154(b) by 457 days.

(21) Appl. No.: 12/176,983

(22) Filed: Jul. 21, 2008

(65) Prior Publication Data
US 2009/0019778 A1 Jan. 22, 2009

Related U.S. Application Data

(60) Provisional application No. 60/951,082, filed on Jul. 20, 2007, provisional application No. 60/976,131, filed on Sep. 28, 2007.

(51) Int. Cl.
E06B 3/32 (2006.01)

(52) U.S. Cl. ............................................. 49/413; 49/380

(58) Field of Classification Search ..................... 49/380, 49/413
See application file for complete search history.

(56) References Cited

U.S. PATENT DOCUMENTS

| 4,124,054 A | 11/1978 | Spretnjak |
| 5,442,880 A | 8/1995 | Gipson |
| 5,473,840 A | 12/1995 | Gillen et al. |
| 5,505,023 A | 4/1996 | Gillen et al. |
| 5,522,191 A | 6/1996 | Wenner et al. |
| 5,542,214 A | 8/1996 | Buening |
| 5,799,449 A | 9/1998 | Lyons et al. |
| 5,853,895 A | 12/1998 | Lewno |
| 6,223,470 B1 | 5/2001 | Millard et al. |
| 6,591,552 B1 | 7/2003 | Rasmussen |
| 7,003,916 B2 | 2/2006 | Nestell et al. |
| 7,155,863 B2 | 1/2007 | Daniel et al. |
| 7,219,470 B2 | 5/2007 | Lahnala |
| 2003/0182866 A1* | 10/2003 | Nestell et al. .................. 49/413 |
| 2005/0044797 A1* | 3/2005 | Daniel et al. .................. 49/413 |
| 2005/0044798 A1* | 3/2005 | Daniel et al. .................. 49/413 |

* cited by examiner

Primary Examiner — Jerry Redman
(74) Attorney, Agent, or Firm — Howard & Howard Attorneys PLLC

(57) ABSTRACT

A sliding window assembly for a vehicle includes first and second fixed window panes spaced from each other defining an opening therebetween. A sliding window pane is moveable relative to the first and second fixed window panes for covering and uncovering the opening. First and second tracks are spaced from each other and are connected to the first and second fixed window panes. The first and second tracks are coupled to the sliding window pane for guiding movement of the sliding window pane relative to the first and second fixed window panes. The first track and the second track are rigidly interconnected only by the first and second fixed window panes.

19 Claims, 9 Drawing Sheets

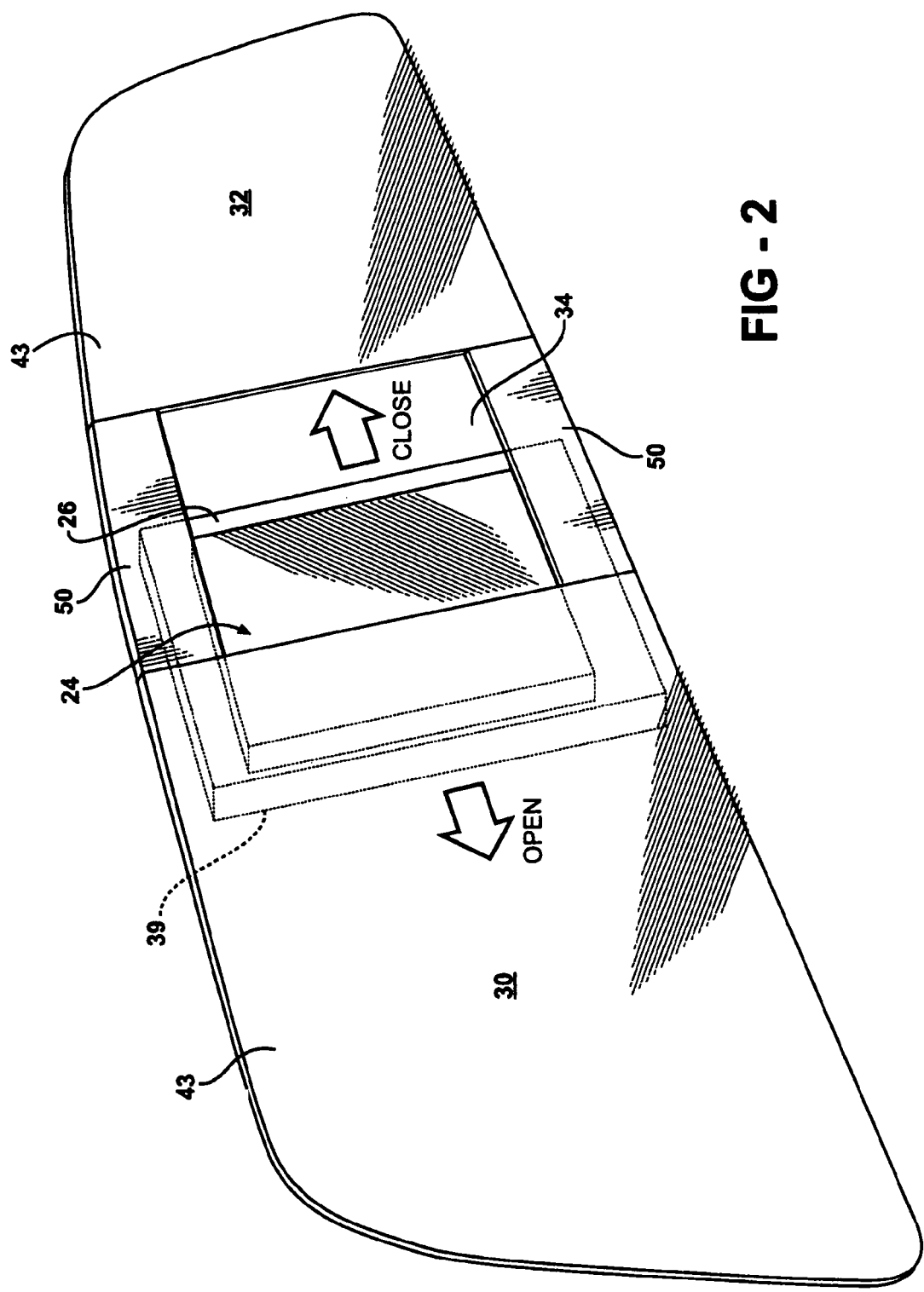

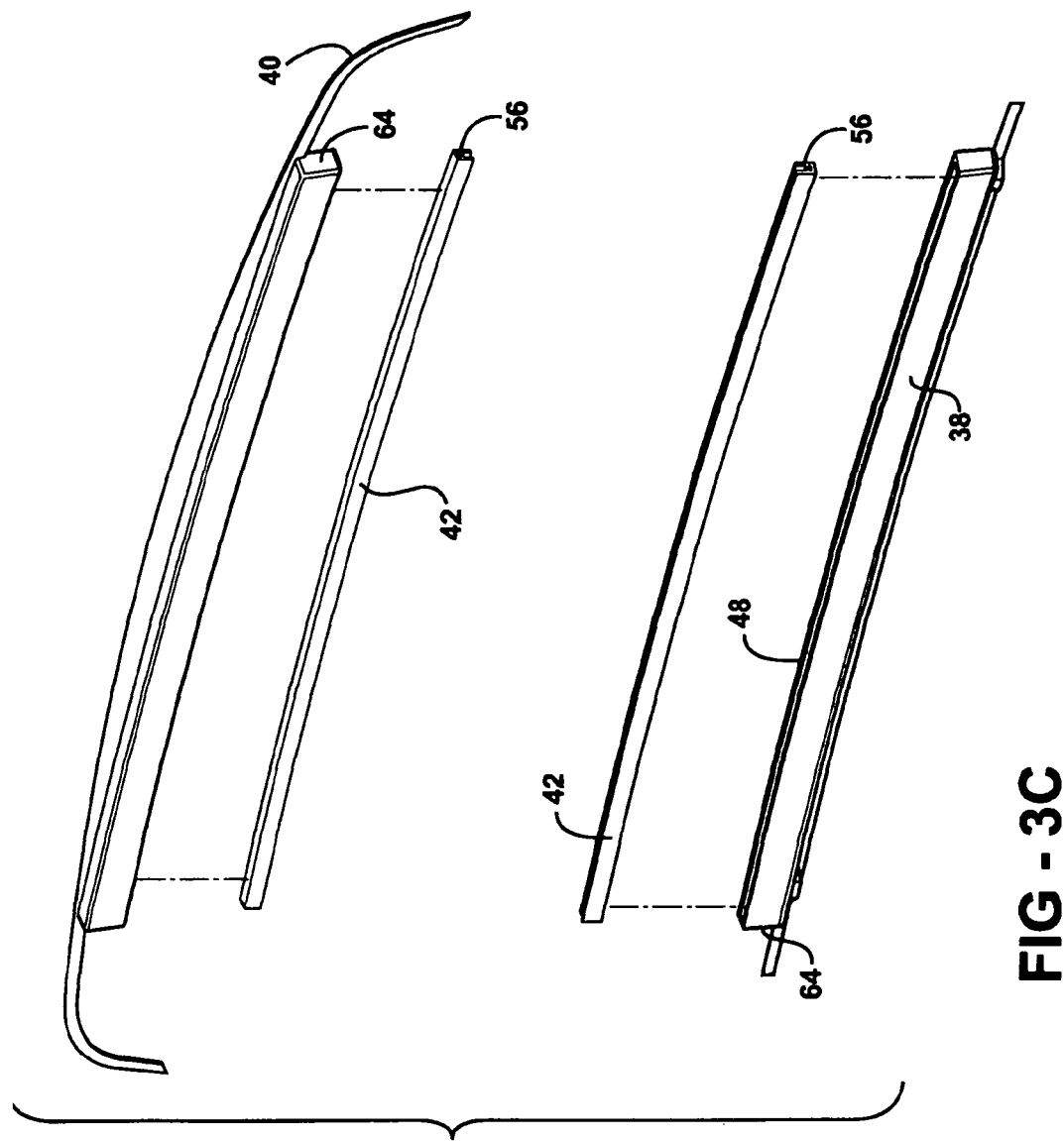
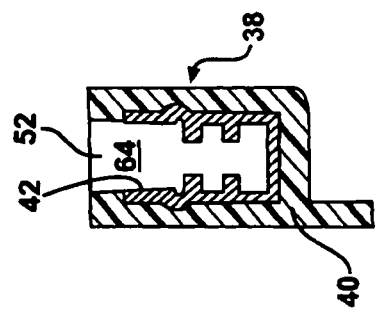
FIG - 3C
FIG - 3B

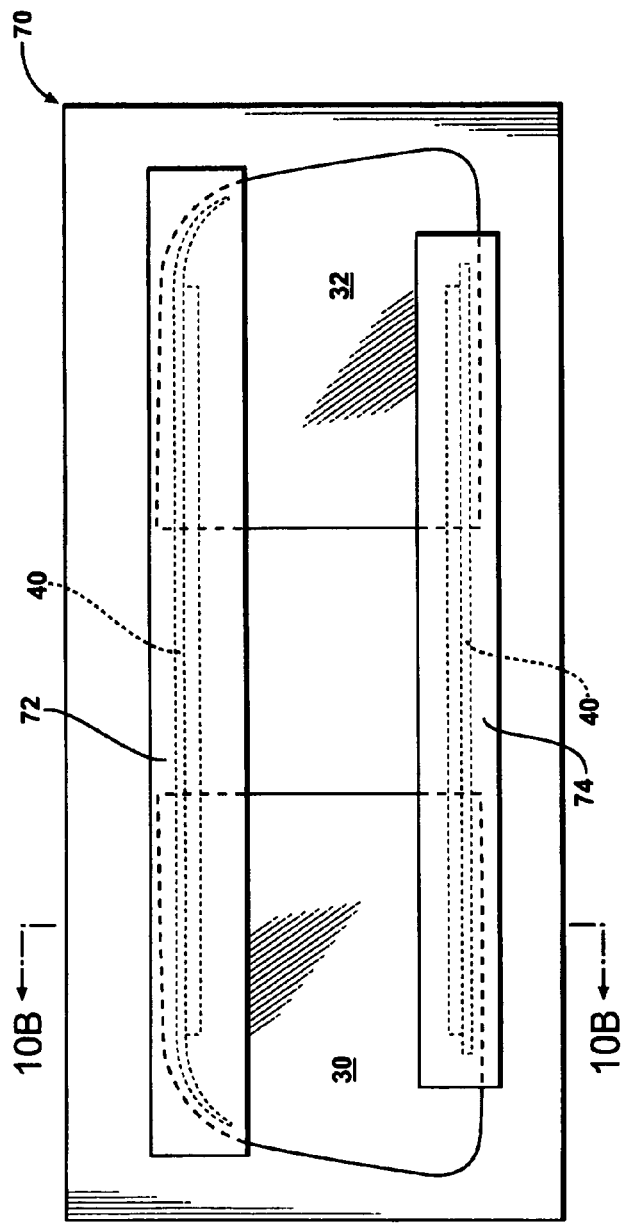
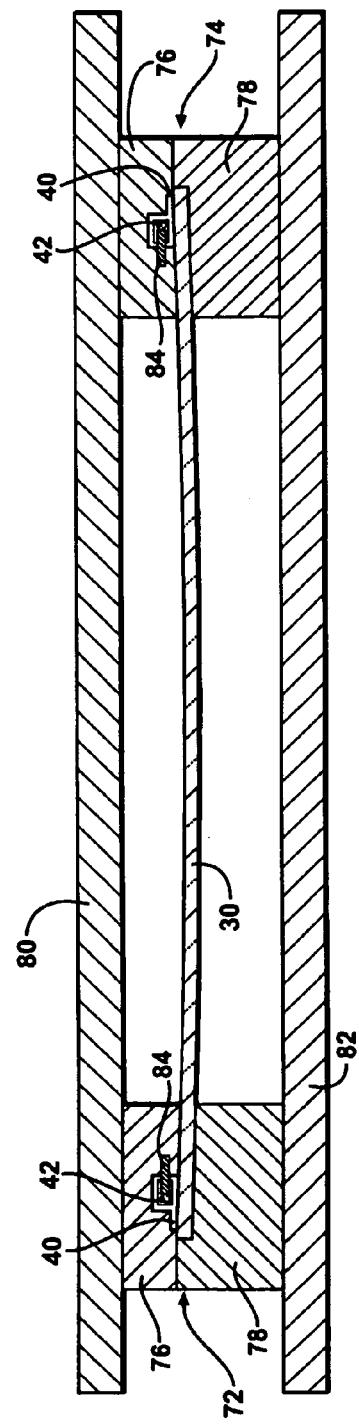
FIG - 10A
FIG - 10B

SLIDING WINDOW ASSEMBLY AND METHOD OF FORMING THE SAME

CROSS-REFERENCE TO RELATED APPLICATIONS

The subject patent application claims priority to and all the benefits of U.S. Provisional Patent Application Ser. No. 60/951,082 which was filed on Jul. 20, 2007 and U.S. Provisional Patent Application Ser. No. 60/976,131 which was filed on Sep. 28, 2007, the entire specification of both of which are expressly incorporated herein by reference.

BACKGROUND OF THE INVENTION

1. Field of the Invention

The invention generally relates to a sliding window assembly and a method of forming the same. Specifically, the sliding window assembly is one that is typically used in a vehicle.

2. Description of the Related Art

Sliding window assemblies for vehicles are known in the prior art. The sliding window assembly includes a frame attached to the vehicle. A first fixed panel and a second fixed panel are attached to the frame and are spaced from each other defining an opening therebetween. A pair of tracks is attached to the frame and a sliding unit is slideable along the pair of tracks between an open and closed position to modify the size of the opening.

The frame includes an upper and a lower horizontal rail. One of the pair of tracks is attached to the upper horizontal rail and the other of the pair of tracks is attached to the lower horizontal rail. The frame also includes a pair of vertical rails extending between and engaging the upper and lower horizontal rails. Typically one of the pair of vertical rails extends along the first fixed panel at the opening and the other of the pair of vertical rails extends along the second fixed panel at the opening.

The pair of vertical rails adds structural rigidity to the sliding window assembly when the sliding window assembly is attached to the vehicle. Also, the pair of vertical rails attach to the first and second fixed panels to maintain the fixed panels in position relative to each other during assembly of the sliding window assembly to the vehicle. Additionally, each of the pair of vertical rails includes a seal for sealing against the sliding unit.

However, it is advantageous to reduce the amount of material used to manufacture the sliding window assembly and it is advantageous to reduce the weight of the sliding window assembly. As such, it would be advantageous to manufacture a sliding window assembly that eliminates the need for the pair of vertical members while still maintaining the rigidity and sealing capabilities of the sliding window assemblies of the prior art.

SUMMARY OF THE INVENTION AND ADVANTAGES

The present invention includes a sliding window assembly for a vehicle. The sliding window assembly comprises a first fixed window pane and a second fixed window pane spaced from and fixed relative to the first fixed window pane defining an opening therebetween. A sliding window pane is moveable relative to the first and second fixed window panes for covering and uncovering the opening. A first track is connected to the first fixed window pane and to the second fixed window pane and is coupled to the sliding window pane for guiding movement of the sliding window pane relative to the first and second fixed window panes. A second track is spaced from the first track and is connected to the first fixed window pane and to the second fixed window pane and is coupled to the sliding window pane for guiding the movement of the sliding window pane relative to the first and second fixed window panes. The first track and the second track are rigidly interconnected only by the first and second fixed window panes.

The present invention also includes a method of forming a sliding window assembly having a first fixed window pane, a second fixed window pane spaced from and fixed relative to the first fixed window pane, and a pair of tracks each having a structural rail and an attachment member connecting the structural rail to the first and second fixed window panes. The method comprises providing a first mold and a second mold spaced from each other and each having a core and a cavity. The method includes inserting the structural rail of the first track between the core and the cavity of the first mold and inserting the structural rail of the second track between the core and the cavity of the second mold. The method also includes positioning the first fixed window pane spaced from the structural rails of the first and second tracks between the core and the cavity of the first mold and between the core and the cavity of the second mold. The method also includes positioning the second fixed window pane spaced from the first fixed window pane and spaced from the structural rails of the first and second tracks between the core and the cavity of the first mold and between the core and the cavity of the second mold. The method also includes injecting material into the first and second molds to form the attachment members with the first track and the second track rigidly interconnected only by the first and second fixed window panes.

The design of the sliding window assembly eliminates the need for any sort of rigid vertical members connecting the first and second tracks to each other. The elimination of any sort of rigid vertical members reduces the total amount of material thereby reducing the material cost associated with manufacturing the sliding window assembly. The elimination of any sort of vertical members also decreases the weight of the sliding window assembly.

In addition, the use of the first and second molds results in a reduction in cost. Because the first track and the second track are rigidly interconnected only by the first and second fixed window panes, the mold assembly includes two relatively small molds as opposed to one large mold. Material is thus reduced in making the first and second molds as opposed to one relatively large mold thereby reducing the material cost to form the molds.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 2 is a perspective view of the sliding window assembly;

FIG. 3B is a cross-sectional view along line 3B of FIG. 3A;

FIG. 3C is an exploded view of a track of the sliding window assembly of FIG. 3A;

FIG. 10A is a top view of a mold assembly for forming the sliding window assembly; and FIG. 10B is a cross-sectional view of the mold assembly along line 10B of FIG. 10A.

DETAILED DESCRIPTION OF THE INVENTION

Figure 1:
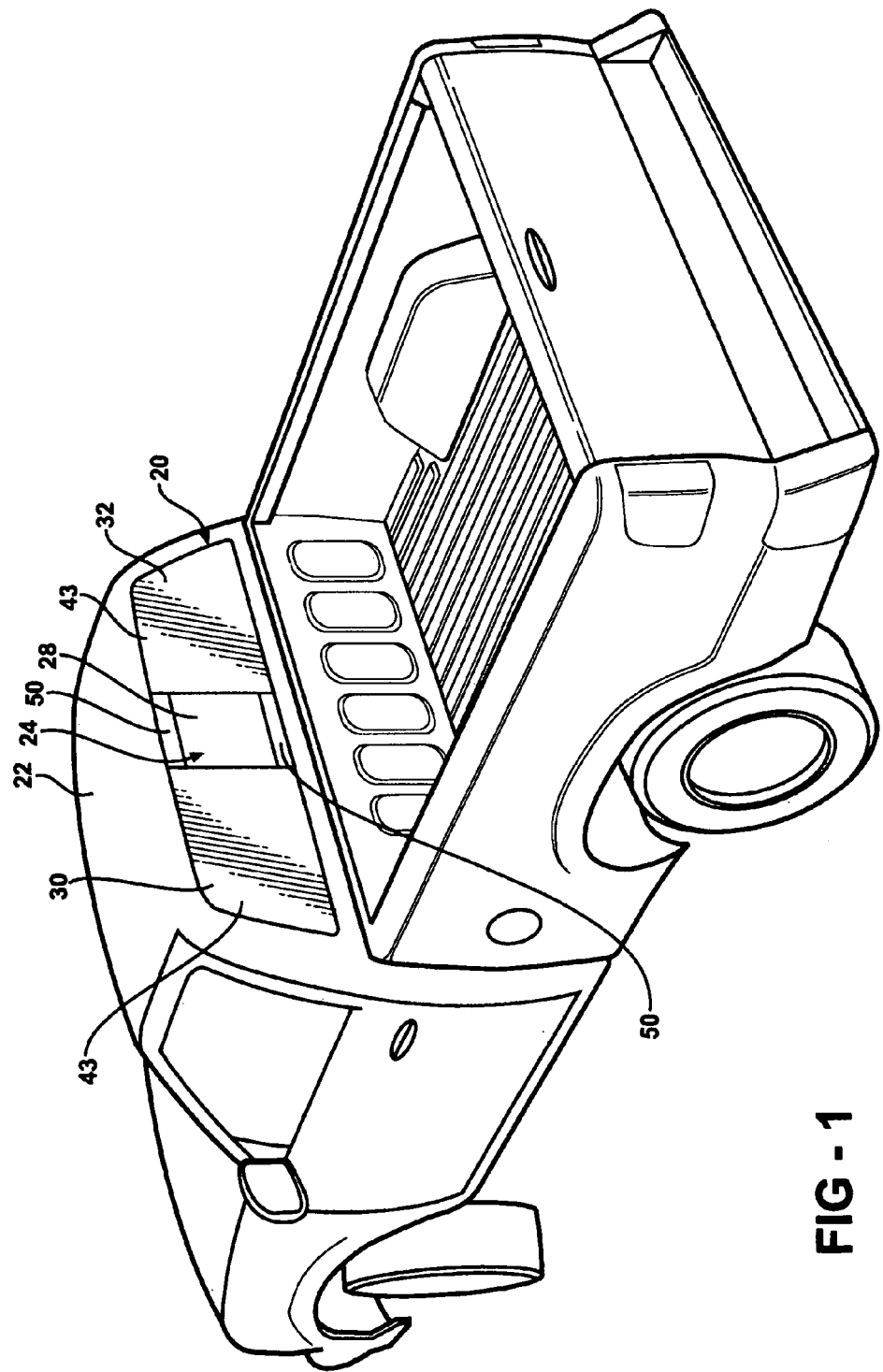
FIG. 1 is a perspective view of a vehicle including a sliding window assembly.

Referring to the Figures, wherein like numerals indicate like parts throughout the several views, a sliding window assembly is generally shown at 20. In FIG. 1, the sliding window assembly 20 is shown in a vehicle 22, specifically as a backlite in a pickup truck. However, it should be appreciated that the sliding window assembly 20 of the present invention can be implemented in other types of vehicles 22, as well as in non-vehicle applications.

As shown in FIGS. 1-5, the sliding window assembly 20 includes a first fixed window pane 30 and a second fixed window pane 32 spaced from and fixed relative to the first fixed window pane 30 defining an opening 34 therebetween. A first track 36 and a second track 38 are each connected to the first and second fixed window panes 30, 32. A sliding window pane 24 is moveable, e.g., slideable, relative to the first and second fixed window panes 30, 32 along the first and second tracks 36, 38. Specifically, the sliding window pane 24 is moveable between a closed position for covering the opening 34 and an open position for uncovering the opening 34. In FIG. 1, the sliding window assembly 20 is shown with the sliding window pane 24 in the closed position. In FIG. 2, the sliding window assembly 20 is shown with the sliding window pane 24 between the closed position and the open position, i.e., the sliding window pane 24 is partially opened. The sliding window pane 24 typically slides horizontally, but it should be appreciated that the sliding window pane 24 can also slide in other directions, e.g., vertically, without departing from the nature of the present invention. In FIGS. 2, 3A, and 4A, for example, the sliding window pane 24 slides to the left to the open position and slides to the right to the closed position, but it should be appreciated that the sliding window pane 24 can slide in any direction between the open and closed position without departing from the nature of the present invention. It should also be appreciated that the sliding window pane 24 can slide in more than one direction from the closed to the open positions.

Figure 5:
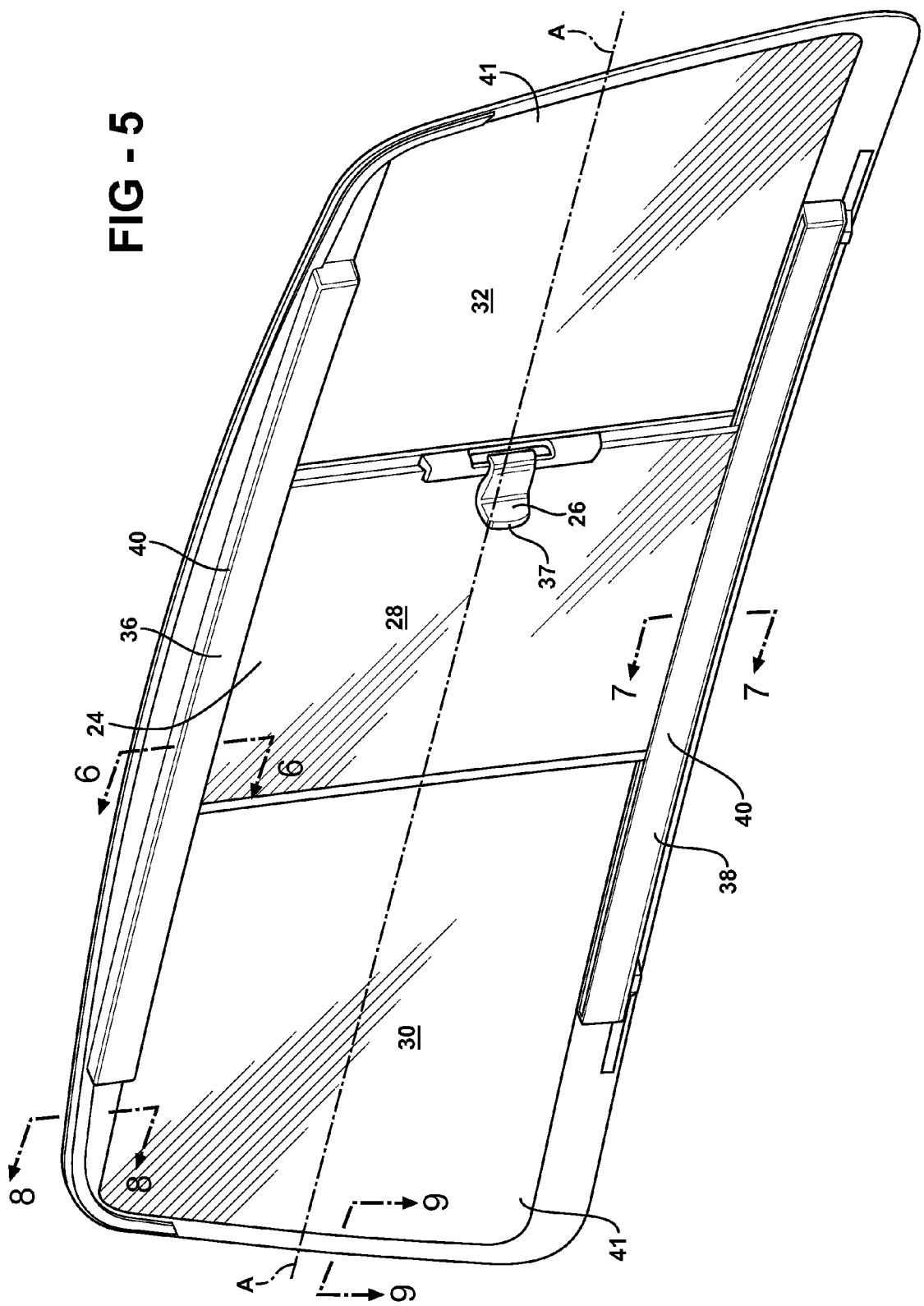
FIG. 5 is a perspective view of the sliding window assembly.
Figure 8:
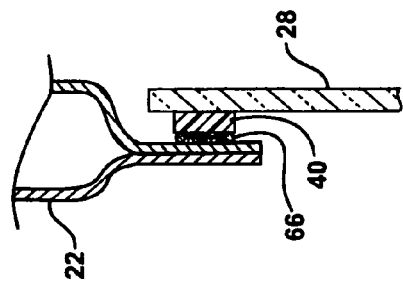
FIG. 8 is a cross-sectional view of the sliding window assembly of FIG. 5 mounted to the vehicle taken along line 8 of FIG. 5.
Figure 9:
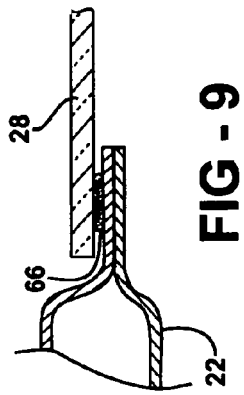
FIG. 9 is a cross-sectional view of the sliding window assembly of FIG. 5 mounted to the vehicle taken along line 9 of FIG. 5.

As shown in FIG. 2, the sliding window pane 24 includes a carrier component 26 and a sliding panel 28 connected to the carrier component 26. The sliding panel 28 is typically formed of glass. However, it should be appreciated that the sliding panel 28 may be formed of plastic, metal, or any other suitable material. The sliding panel 28 can be, for example, a single pane of glass that slides along the first and second tracks 36, 38 in contact with the first and second tracks 36, 38, as shown in FIG. 5. In such a configuration, the carrier component 26 is a handle 37 connected to the sliding panel 28, for example, with an adhesive, by single-sided encapsulation, or any other way known to one skilled in the art.

Alternatively, the carrier component 26 can be a frame 39 surrounding the periphery of the sliding panel 28, as shown in FIG. 2. In such a configuration, the carrier component 26 is typically formed of a rigid plastic, such as Zytel®, or a similar plastic of a polymer family and a connection between the carrier component 26 and the sliding panel 28 is accomplished, for example, by glass encapsulating the carrier component 26 around the sliding panel 28, with an adhesive, or any other way known to one skilled in the art. In such a configuration, the carrier component 26 slides along the first and second tracks 36, 38 in contact with the first and second tracks 36, 38.

As set forth above, the sliding window assembly 20 includes at least one fixed window pane. In the configuration shown in the Figures, the sliding window assembly 20 includes a first fixed window pane 30 and a second fixed window pane 32. Like the sliding panel 28, the first and second fixed window panes 30, 32 are typically formed of glass, but can be formed of plastic, metal, and the like. It should be appreciated that the first and second fixed window panes 30, 32 can include black-out sections, e.g., tinting or ceramic coating such as that referred to in industry as frit, around a selected periphery to hide the first and second tracks 36, 38 from sight from the exterior of the vehicle 22. In such a configuration, the black-out section is typically disposed between the fixed window pane 30, 32 and the track 36, 38.

As shown in FIGS. 3A-5, the sliding window assembly 20 includes a first track 36 and a second track 38 spaced from the first track 36. As set forth further below, the first and second tracks 36, 38 are each connected to the first fixed window pane 30 and the second fixed window pane 32. In addition, the first and second tracks 36, 38 are coupled to the sliding window pane 24 for guiding movement of the sliding window pane 24 relative to the first and second fixed window panes 30, 32. In other words, as set forth further below, the sliding window pane 24 is moveable along the first and second tracks 36, 38 relative to the first and second fixed window panes 30, 32.

The first and second tracks 36, 38 extend generally horizontally and parallel to one another along a periphery of the first and second fixed window panes 30, 32. Each of the first and second tracks 36, 38 includes an attachment member 40 and a structural rail 42 connected to the attachment member 40. The attachment member 40 is connected to and extends between the first and second fixed window panes 30, 32. Typically the attachment member 40 includes end portions curving downwardly along the fixed window panes 30, 32 and the attachment member 40 tapers, i.e., thins out. As set forth further below, the attachment member 40 tapers to ensure a flush fit between the sliding window assembly 20 and the vehicle 22.

The first and second tracks 36, 38 are typically connected to the first and second fixed window panes 30, 32 by adhesive surface bonding to the first and second fixed window panes 30, 32. For example, the adhesive surface bonding can be a process referred to in industry as glass encapsulation. For example, the glass encapsulation can be further defined as single-sided encapsulation, two-sided encapsulation, or three-sided encapsulation. In such a scenario, the first and second tracks 36, 38 are formed at least partially from glass encapsulation material. It should be appreciated that the adhesive surface bonding can be any type of adhesive surface bonding other than glass encapsulation without departing from the nature of the present invention.

Specifically, with respect to glass encapsulation, each of the attachment members 40 is formed and connected to the first and second fixed window panes 30, 32 and the respective structural rail 42 by glass encapsulation. In other words, each of the attachment members 40 is preferably connected to the first and second fixed window panes 30, 32 and the respective structural rail 42 by glass encapsulation.

As set forth above, the glass encapsulation can be, for example, further defined as single-sided glass encapsulation. As known to one skilled in the art, with single-sided glass encapsulation, each part, e.g., the first and second tracks 36, 38, is attached to one side of the first and second fixed window panes 30, 32. Specifically, the first and second fixed window panes 30, 32 have an interior surface 41 for facing an interior of the vehicle 22 and an exterior surface 43 for facing an exterior of the vehicle 22. The first and second tracks 36, 38 are fixed to the interior surface 41 to be disposed in the interior of the vehicle 22 and the exterior surface 43 is free of adhesive surface bonding to the first and second fixed window panes 30, 32. Therefore, the sliding window assembly 20 formed by single-sided glass encapsulation is aesthetically pleasing and reduces drag and wind noise of the vehicle 22. Single-sided glass encapsulation is advantageous in that the sliding window assembly 20 is formed of less material than with other types of glass encapsulation. Further, with single-sided glass encapsulation, the cosmetic surfaces, i.e. show surfaces, of the sliding window assembly 20 are formed entirely by the first and second fixed window panes 30, 32 thereby eliminating the need to form a cosmetic surface by glass encapsulation. Cosmetic surfaces require an aesthetically pleasing appearance and it is difficult to form an aesthetically pleasing cosmetic surface with material that is glass encapsulated with the first and second fixed window panes 30, 32. If the cosmetic surface of such a product is not aesthetically pleasing, then the product is typically scrapped.

When formed by glass encapsulation, typically the attachment member 40 is formed of polyvinyl chloride (PVC). However, it should be appreciated that the attachment member 40 may be formed from any type of material suitable for glass encapsulation. Each of the structural rails 42 are typically formed from metal such as aluminum. However, it should be appreciated that the structural rails 42 may be formed of any type of suitable material.

The first and second tracks 36, 38 are each integral with the first and second fixed window panes 30, 32. Specifically, the attachment member 40 of the first track 36 is integral with the structural rail 42 of the first track 36 and with the first and second fixed window panes 30, 32. Likewise, the attachment member 40 of the second track 38 is integral with the structural rail 42 of the second track 38 and with the first and second fixed window panes 30, 32. It should be appreciated that even though the attachment member 40 and the structural rail 42 are integral, the attachment member 40 and the structural rail 42 are shown in an exploded view in FIGS. 3C and 4D in order to show details of these parts. In other words, the first and second tracks 36, 38 and the first and second fixed window panes 30, 32 form a single continuous unit.

The attachment members 40 of the first and second tracks 36, 38 provide the attachment of the first and second tracks 36, 38, respectively, to the first and second fixed window panes 30, 32. The structural rails 42 of the first and second fixed window panes 30, 32 provide structural reinforcement to the first and second tracks 36, 38, respectively. The first track and the second track 36, 38 are rigidly interconnected only by the first and second fixed window panes 30, 32. In other words, the sliding window assembly 20 has an axis A extending along the first and second fixed window panes 30, 32 and the first and second fixed window panes 30, 32 along the axis A are free of adhesive surface bonding to the first and second fixed window panes 30, 32. Specifically, the axis A extends across the first and second fixed window panes 30, 32 free of adhesive surface bonding to the first and second fixed window panes 30, 32. In the scenario where the adhesive surface bonding is further defined as glass encapsulation, the first and second fixed window panes 30, 32 along the axis A are free of glass encapsulation material. The design of the sliding window assembly 20, including the use of glass encapsulation, eliminates the need for any sort of rigid or supporting vertical members connecting the first and second tracks 36, 38 to each other. The elimination of any sort of rigid or supporting vertical members reduces the total amount of material thereby reducing the material cost associated with manufacturing the sliding window assembly 20. In addition, such an elimination also advantageously decreases the weight of the sliding window assembly 20.

Figure 3A:
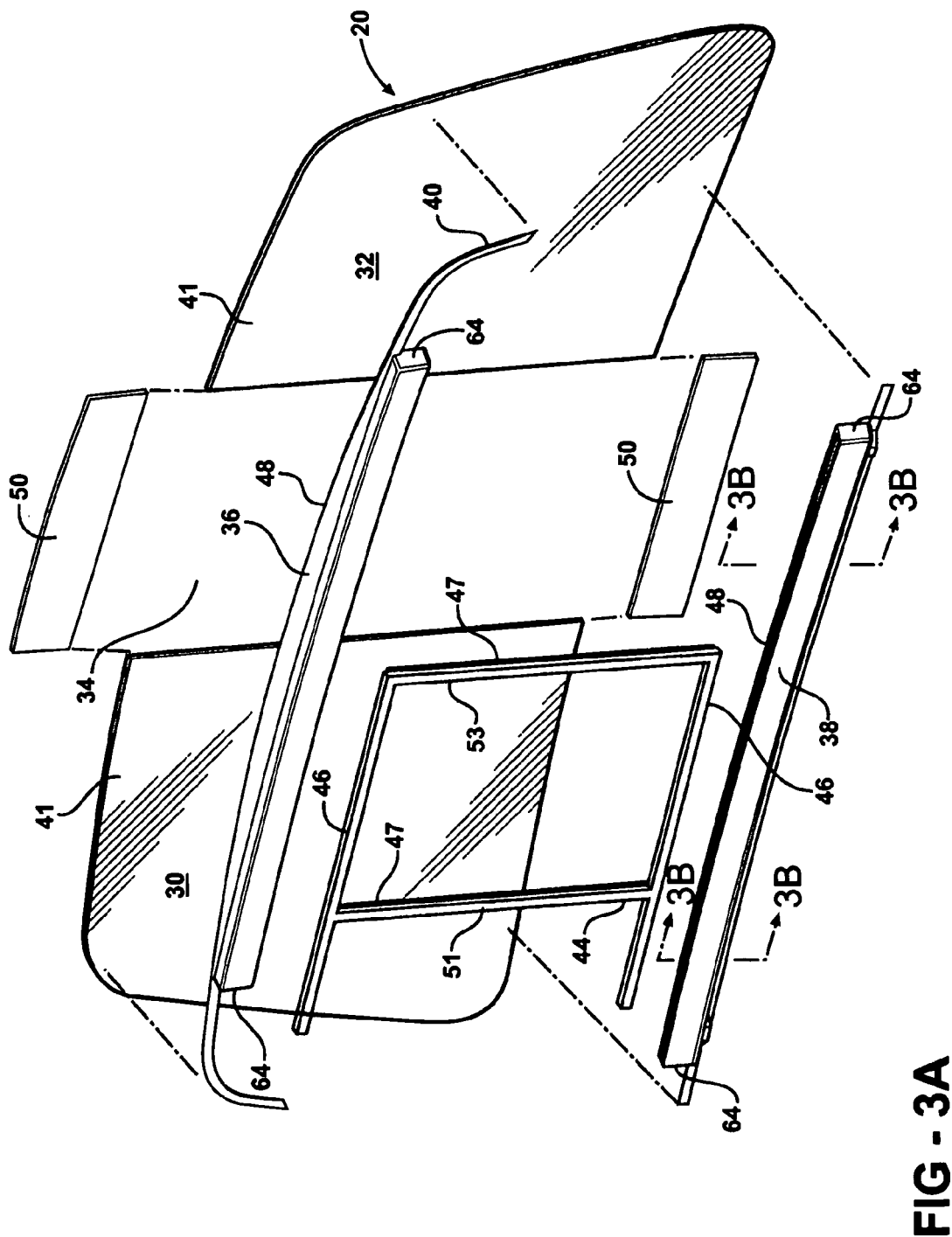
FIG. 3A is an exploded view of the sliding window assembly.
Figure 4B:
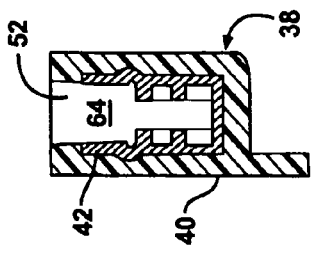
FIG. 4B is a cross-sectional view along line 4B of FIG. 4A.
Figure 4C:
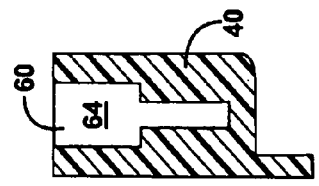
FIG. 4C is a cross-sectional view along line 4C of FIG. 4A.
Figure 4A:
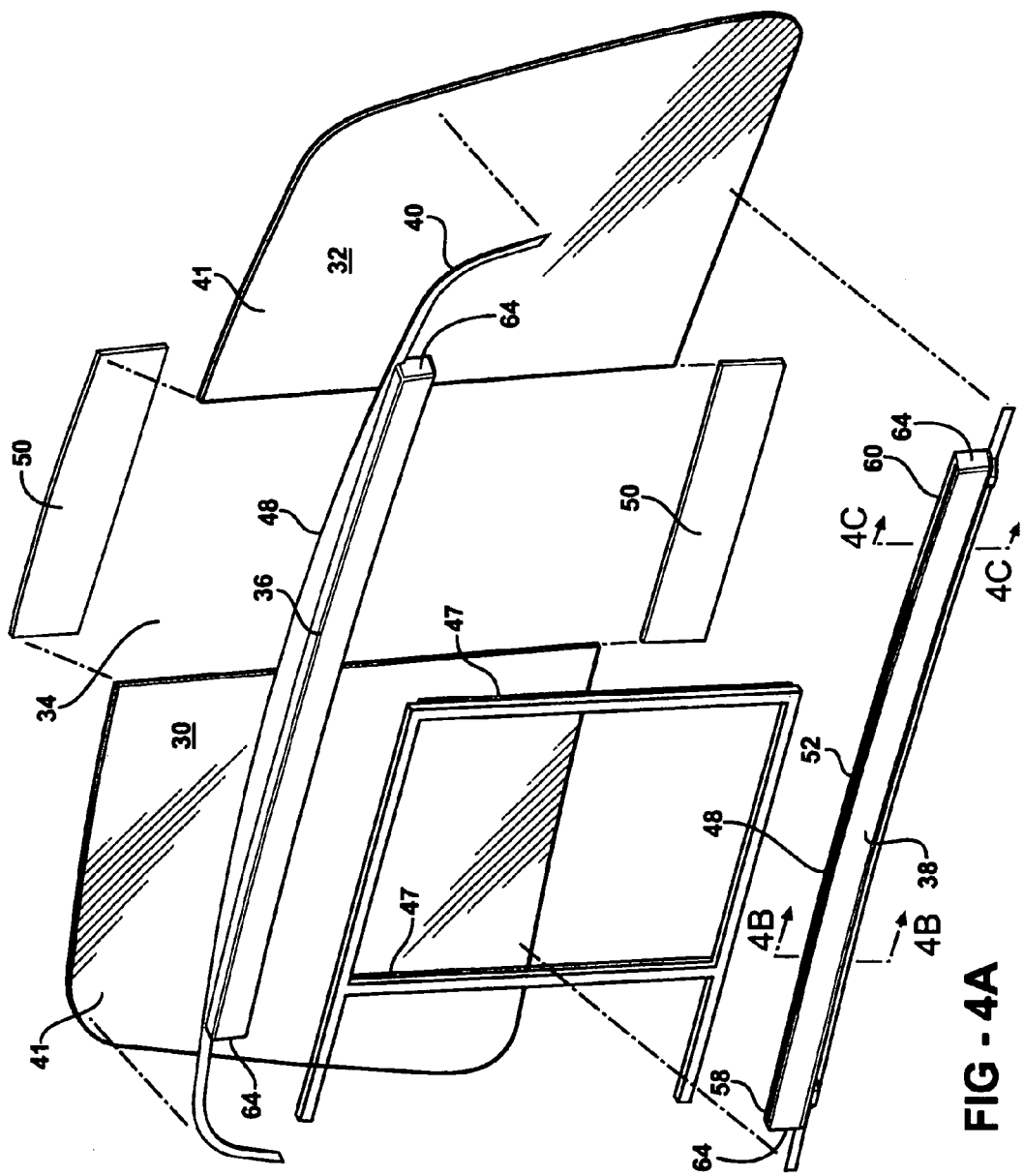
FIG. 4A is an exploded view of another embodiment of the sliding window assembly.
Figure 4D:
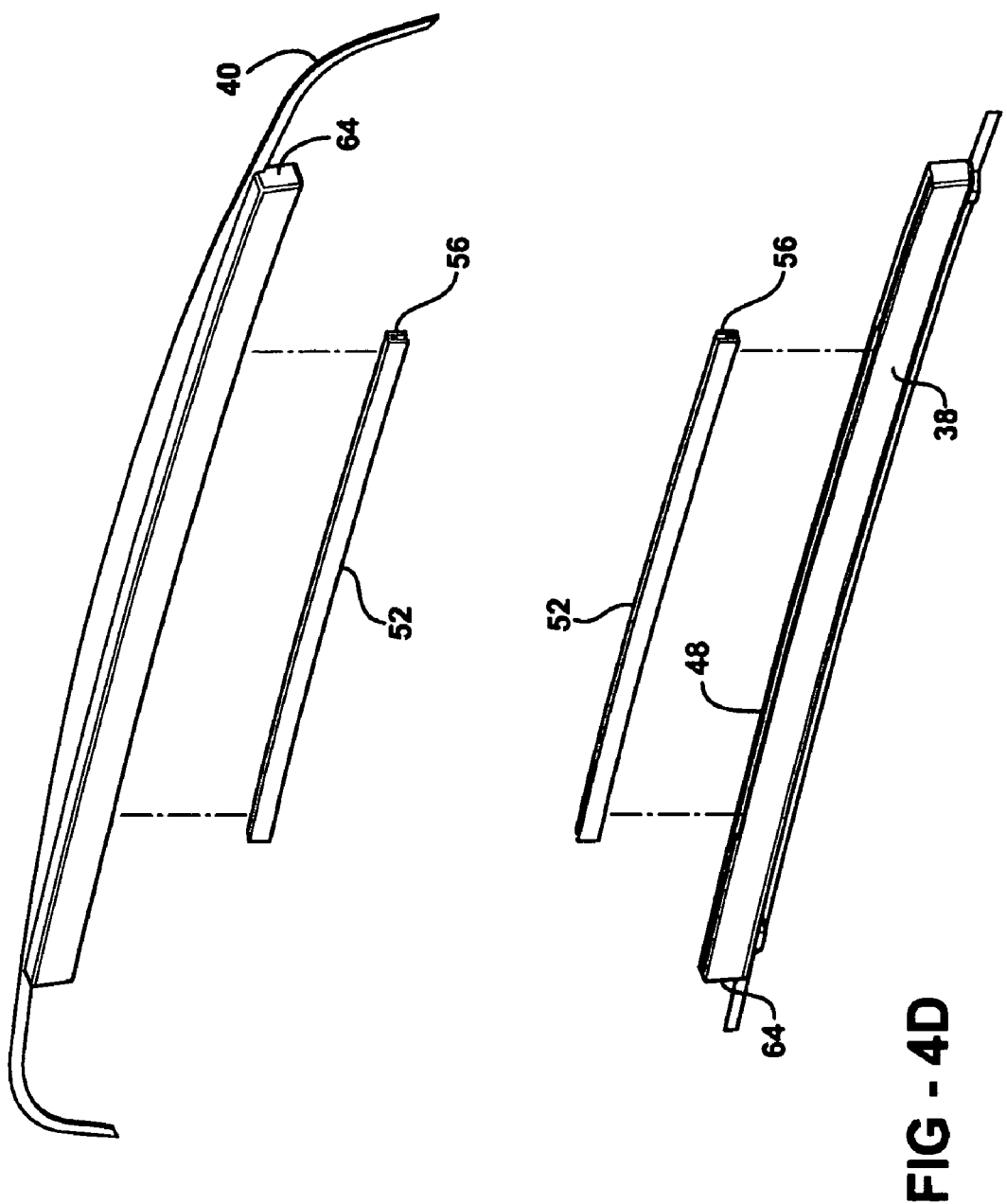
FIG. 4D is an exploded view of a track of the sliding window assembly of FIG. 4A.

As shown in FIGS. 3A and 4A, each attachment member 40 presents a mounting surface 48. A first and a second applique 50 are mounted to the mounting surfaces 48, respectively. Specifically, the first and second appliques 50 are situated in the opening 34 between the first and second fixed window panes 30, 32 and above and below the sliding panel 28, respectively. The first and second fixed window panes 30, 32 and the first and second appliques 50 present exterior surfaces which are substantially flush relative each other. The first and second appliques 50 are typically formed of a polycarbonate plastic, but can be formed of other plastics, glass, metal, and the like. In the configuration where the attachment members 40 are formed by glass encapsulation, the first and second appliques 50 are typically attached to attachment members 40 by glass encapsulation. However, it should be appreciated that the first and second appliques 50 may be attached to the attachment members 40 in any fashion, for example by adhesive or bonding.

As best shown in FIGS. 3A-4D, each structural rail 42 defines a channel 52. The channel 52 of the structural rail 42 of the first track 36 faces downwardly and the channel 52 of the structural rail 42 of the second track 38 faces upwardly. The sliding window pane 24 is received by the channels 52 of the first and second structural rails 42 and is slideable along the channels 52 relative to the first and second fixed window panes 30, 32. Each of the structural rails 42 extends between a first end 54 and a second end 56 with the channel 52 extending between the first and second ends 54, 56.

As shown in FIGS. 3A-7, the sliding window assembly 20 includes a seal 44 for sealing the sliding window pane 24 to the first and second fixed window panes 30, 32 and the structural rails 42. The seal 44 extends from the first track 36 to the second track 38 and is in contact with the sliding window pane 24 and at least one of the first and second fixed window panes 30, 32 when the sliding window pane 24 is covering the opening 34. The seal 44 is applied to at least one of the first and second fixed window panes 30, 32 and typically is applied to both the first and second fixed window panes 30, 32 and the structural rails 42. In any event, the seal 44 is typically applied after the adhesive surface bonding, e.g., the glass encapsulation, but can be applied at any time.

The seal 44 includes a pair of horizontal portions 46, a first vertical portion 51, and a second vertical portion 53. Typically, the vertical portions 51, 53 and the horizontal portions 46 are integral with each other such that the seal 44 is a one-piece seal.

As shown in FIG. 5, the vertical portions 51, 53 are in contact with the first and second fixed window panes 30, 32, respectively, and the sliding window pane 24 when the sliding window pane 24 is covering the opening 34 in the closed position. The vertical portions 51, 53 are typically attached, e.g., adhered, to the first and second fixed window panes 30, 32, respectively. Typically, the vertical portions 51, 53 are adhered to the first and second fixed window panes 30, 32 with tape 47. However, it should be appreciated that the vertical portions 51, 53 may be attached to the first and second fixed window panes 30, 32 in any fashion, for example, with adhesive. The seal 44 is formed of any suitable material without departing from the nature of the present invention. For example, the seal 44 is preferably ethylene propylene diene monomer. Alternatively, for example, the seal 44 is thermoplastic vulcanizates or thermoplastic elastomer.

Figure 7:
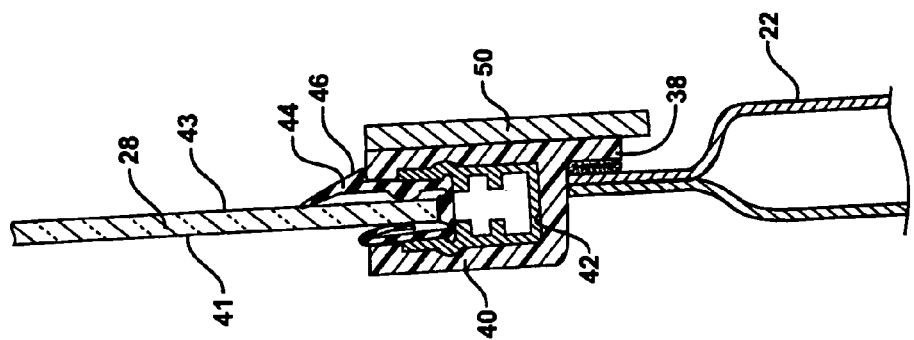
FIG. 7 is a cross-sectional view of the sliding window assembly of FIG. 5 mounted to the vehicle taken along line 7 of FIG. 5.
Figure 6:
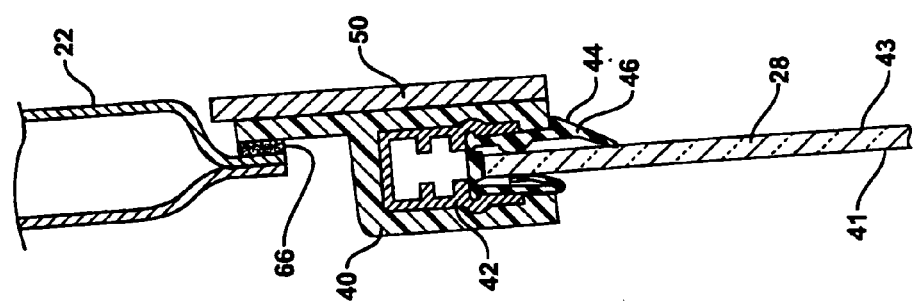
FIG. 6 is a cross-sectional view of the sliding window assembly of FIG. 5 mounted to the vehicle taken along line 6 of FIG. 5.

The sliding window pane 24 is slideable between and along the horizontal portions 46 of the seal 44. One of the horizontal portions 46 is disposed in the channel 52 of the first track 36 between the sliding window pane 24 and the first track 36 and the other horizontal portion 46 is disposed in the channel 52 of the second track 38 between the sliding window pane 24 and the second track 38. In other words, the horizontal portions 46 are disposed in each of the structural rails 42. FIGS. 6 and 7 show a cross-sectional view of one of the horizontal portions 46 of the seal 44 disposed in the channel 52 of the attachment member 40. It should be appreciated that the seal 44 is disposed in both of the attachment members 40 of the first and second tracks 36, 38, respectively.

In one embodiment of the sliding window assembly 20 shown in FIGS. 3A-3C, the attachment members 40 present end walls 64 at the first and second ends 54, 56 of the respective structural rail 42. The end walls 64 prevent the carrier component 26 of the sliding window pane 24 from exiting the channel 52.

In another embodiment of the sliding window shown in FIGS. 4A-4D, at least one of the attachment portions defines at least one extension channel aligned with the channel 52 of the respective structural rail 42 along an axis A. The extension channel is shown in cross-section in FIG. 4C. The carrier component 26 of the sliding window pane 24 is slideable along the channel 52 and the extension channel. In the configuration shown in FIG. 4A, the attachment member 40 of the second track 38 defines a first extension channel 58 extending from the first end 54 of the structural rail 42 and a second extension channel 60 extending from the second end 56 of the structural rail 42. The attachment member 40 presents the end walls 64 at ends 54, 56 of the first and second extension channels 58, 60 opposite the first and second ends 54, 56, respectively, of the structural rail 42.

As shown in FIGS. 5-9, the sliding window assembly 20 is typically attached to the vehicle 22 with an adhesive 66 such as urethane or butyl. Specifically, the adhesive 66 is disposed around the periphery of the sliding window assembly 20. More specifically, the adhesive 66 is typically disposed in a continuous line around the periphery of the sliding window assembly 20 along the first and second tracks 36, 38 and along the first and second fixed window panes 30, 32 between the first and second tracks 36, 38. Because the end portions of the attachment members 40 taper, the adhesive 66 more readily fills any space between the vehicle 22 and the end portions of the attachment members 40 and the first and second fixed window panes 30, 32, i.e., reducing the likelihood of a gap in the adhesive 66 where the end portions meet the first and second fixed window panes 30, 32.

In the configuration where the attachment members 40 are formed by glass encapsulation, a method of forming the sliding window assembly 20 includes the use of a mold assembly 70, as shown in FIGS. 10A and 10B. For example, the mold assembly 70 has a first mold 72 and a second mold 74 spaced from each other. Each of the first and second molds 72, 74 has a core 76 and a cavity 78. Each core 76 is typically mounted to a first base plate 80 and each cavity 78 is typically mounted to a second base plate 82. The first base plate 80 is shown in FIG. 10B, but is not shown in FIG. 10A so that other features can be adequately shown in FIG. 10A. The first and second base plates 80, 82 are moveable relative to each other to move the mold assembly 70 between open and closed positions.

The method further positioning the first fixed window pane between the core 76 and the cavity 78 of the first mold 72 and between the core 76 and cavity 78 of the second mold 34. Likewise, the method includes positioning the second fixed window pane 32 spaced from the first fixed window pane 30 between the core 76 and the cavity 78 of the first mold 72 and between the core 76 and the cavity 78 of the second mold 74. The first and second fixed window panes 30, 32 are typically fixed in position relative to the cavities 78. For example, the cavities 78 include suction cups (not shown) and the first and second fixed window panes 30, 32 are placed on the suction cups.

The method also includes inserting the structural rail 42 of the first track 36 between the core 76 and the cavity 78 of the first mold 72 and inserting the structural rail 42 of the second track 38 between the core 76 and the cavity 78 of the second mold 74. For example, with the mold assembly 70 in the open position, the structural rails 42 are placed on each core 76, respectively. The structural rails 42 are fixed in position relative to the cores 76. For example, each core 76 can include lifters 84 that are extendable and retractable relative to the core 76 and the structural rails 42 are placed on the lifters 84. Specifically, the structural rails 42 receive the lifters 84 in the channel 52. However it should be appreciated that the structural rails 42 may be fixed in position relative to the cavities 78 in any fashion without departing from the nature of the present invention.

The structural rails 42 are spaced from the first and second fixed window panes 30, 32. Typically, the structural rails 42 are spaced above the first and second fixed window panes 30, 32. The cores 76 and the cavities 78 are spaced and oriented such that a gap exists between the structural rails 42 and the first and second fixed window panes 30, 32, e.g., the structural rails 42 are suspended above the first and second fixed window panes 30, 32. For example, in a configuration where the cavities 78 include lifters 84 and suction cups, the lifters 84 and suction cups and are spaced and oriented such that a gap exists between structural rails 42 and the first and second fixed window panes 30, 32. It should be appreciated that the orientation of the structural rails 42 and the first and second fixed window panes 30, 32 relative to the cores 76 and the cavities 78 has been described for exemplary purposes and the structural rails 42 and the first and second fixed window panes 30, 32 can be oriented and fixed to the cores 76 and/or the cavities 78 in any fashion without departing from the nature of the present invention.

After the structural rails 42 and the first and second fixed window panes 30, 32 are fixed in position relative to the cavities 78, material is injected into the first and second molds 72, 74 to form the attachment members 40 with the first track 36 and the second track 38 rigidly interconnected only by the first and second fixed window panes 30, 32, as shown in FIG. 10B. For example, glass encapsulation material, e.g., PVC, in a molten state is injected between the respective cores 76 and cavities 78 when the molds 72, 74 are in the closed position. The glass encapsulation material contacts the structural rails 42 and the first and second fixed window panes 30, 32 such that, upon cooling, the glass encapsulation material forms the attachment members 40. After the glass encapsulation material is injected and cooled, the mold assembly 70 is moved to the open position, the lifters 84 are removed from the channels 52, and the suction cups release the first and second fixed window panes 30, 32. During the injection of the glass encapsulation material between the cores 76 and cavities 78, the mold assembly 70 maintains the structural rails 42 and the first and second fixed window panes 30, 32 in position relative to each other.

The use of the first and second molds 72, 74 results in a reduction in cost to make the mold assembly 70. In the prior art, material formed by glass encapsulation extends around the periphery of the sliding window assembly 20 and thus the mold assembly includes one relatively large mold. Because the present invention includes the first track 36 and the second track 38 spaced from the first track 36, the mold assembly 70 includes two relatively small molds, i.e., the first and second molds 72, 74. Material is thus reduced in making the first and second molds 72, 74 as opposed to one relatively large mold. As such, because the material to form the mold assembly 70 is reduced, the cost to make the mold assembly 70 is consequently reduced.

After the attachment members 40 are formed, the sliding window pane 24 is assembled to the first and second tracks 36, 38. In addition, the seal 44 is disposed on the first and second fixed window panes 30, 32 from the first track 36 to the second track 38, as described above. For example, as described above, the seal 44 is adhered to the first and second fixed window panes 30, 32.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A sliding window assembly for a vehicle, said sliding window assembly comprising:
   a first fixed window pane;
   a second fixed window pane spaced from and fixed relative to said first fixed window pane defining an opening therebetween;
   a sliding window pane moveable relative to said first and second fixed window panes for covering and uncovering said opening;
   a first track connected to said first fixed window pane and to said second fixed window pane and coupled to said sliding window pane for guiding movement of said sliding window pane relative to said first and second fixed window panes; and
   a second track spaced from said first track and connected to said first fixed window pane and to said second fixed window pane and coupled to said sliding window pane for guiding the movement of said sliding window pane relative to said first and second fixed window panes;
   said first and second tracks each defining a channel with said sliding window pane disposed in said channels;
   said first and second tracks being formed at least partially from glass encapsulation material connected to said first and second fixed window panes by single-sided glass encapsulation;
   said first track and said second track being rigidly interconnected only by said first and second fixed window panes;
   each of said first and second tracks having a structural rail defining said channel and an attachment member connecting said structural rail to said first and second fixed window panes; and
   said attachment members being formed of said glass encapsulation material.

2. The sliding window assembly as set forth in claim 1 wherein said first and second fixed window panes have an interior surface for facing an interior of the vehicle and an exterior surface for facing an exterior of the vehicle wherein said first and second tracks are fixed to said interior surface and wherein said exterior surface is free of said glass encapsulation material.

3. The sliding window assembly as set forth in claim 1 further comprising an axis extending along said first and second fixed window panes wherein said first and second fixed window panes along said axis are free of glass encapsulation material.

4. The sliding window assembly as set forth in claim 1 further comprising a seal in contact with said sliding window pane and at least one of said first and second fixed window panes when said sliding window pane is covering said opening.

5. The sliding window assembly as set forth in claim 4 wherein said seal is adhered to at least one of said first and second fixed window panes.

6. The sliding window assembly as set forth in claim 4 wherein said seal extends from said first track to said second track.

7. The sliding window assembly as set forth in claim 1 wherein said structural rail is formed of metal.

8. The sliding window assembly as set forth in claim 1 further comprising a seal having a pair of horizontal portions with one of said horizontal portions disposed in said channel of said first track between said sliding window pane and said first track and with the other of said horizontal portions disposed in said channel of said second track between said sliding window pane and said second track.

9. The sliding window assembly as set forth in claim 8 wherein said seal includes a first vertical portion extending from the first horizontal portion to said second horizontal portion in contact with said first fixed window pane and said sliding window pane when said sliding window pane is covering said opening.

10. The sliding window assembly as set forth in claim 9 wherein said first vertical portion of said seal is adhered to said first fixed window pane.

11. The sliding window assembly as set forth in claim 9 wherein said seal includes a second vertical portion extending from said first horizontal portion to said second horizontal portion in contact with said second fixed window pane and said sliding window pane when said sliding window pane is covering said opening.

12. The sliding window assembly as set forth in claim 11 wherein said first vertical portion of said seal is adhered to said first fixed window pane and said second vertical portion of said seal is adhered to said second fixed window pane.

13. The sliding window assembly as set forth in claim 1 wherein said first and second tracks each extend between end portions spaced from each other on said first and second fixed window panes, respectively, and wherein said first and second tracks taper in thickness at said end portions.

14. The sliding window assembly as set forth in claim 1 wherein said first and second tracks extend in parallel with each other along a periphery of said first and second fixed window panes.

15. The sliding window assembly as set forth in claim 1 wherein said attachment members present a mounting surface between said first and second fixed window panes and wherein appliques are mounted to said mounting surface.

16. The sliding window assembly as set forth in claim 15 wherein said first and second window panes and said appliques present exterior surfaces for facing away from the vehicle and wherein said exterior surfaces are substantially flush relative to each other.

17. The sliding window assembly as set forth in claim 15 wherein said appliques are attached to said mounting surfaces by glass encapsulation.

18. The sliding window assembly as set forth in claim 1 wherein said channel extends longitudinally between a first end and a second end and said attachment members present an end wall formed of said glass encapsulation material at said first end of each of said channels for retaining said sliding window pane in said channel at said first end.

19. The sliding window assembly as set forth in claim 18 wherein said attachment members each present another end wall formed of said glass encapsulation material at said second end of each of said channels for retaining said sliding window pane in said channel at said second end.

* * * * *